United States Patent [19]

Beardsley et al.

[11] Patent Number: 5,893,918
[45] Date of Patent: Apr. 13, 1999

[54] SYSTEM AND METHOD FOR ROTATIONAL POSITION SENSING MISS AVOIDANCE IN DIRECT ACCESS STORAGE DEVICES

[75] Inventors: Brent Cameron Beardsley; Michael Thomas Benhase; Susan Marie Wethington, all of Tucson, Ariz.

[73] Assignee: International Business Machines Corporation, Armonk, N.Y.

[21] Appl. No.: 07/885,099

[22] Filed: May 18, 1992

[51] Int. Cl.[6] ................................................ G06F 13/00
[52] U.S. Cl. ............................................................. 711/112
[58] Field of Search ............................. 395/425, 725, 395/325; 364/DIG. 1; 711/112

[56] References Cited

U.S. PATENT DOCUMENTS

4,583,166  4/1986  Hartung et al. ................ 395/425
5,146,576  9/1992  Beardley et al. ................ 395/425

*Primary Examiner*—David L. Robertson
*Attorney, Agent, or Firm*—Robert M. Sullivan; Andrew J. Dillon

[57] ABSTRACT

A method for operating a controller for a plurality of direct access storage devices to minimize rotational misses during data transfer operations. Transferred data is staged into a controller cache when a rotational position sensing miss avoidance reconnection is made. Circumstances are detailed for qualifying an operation pending on direct access storage devices for treatment as miss avoidance candidates. Adjustment of controller response depending upon foreknowledge that a channel command word chain includes a write operation is also accomplished utilizing the present method.

15 Claims, 4 Drawing Sheets

SYSTEM AND METHOD FOR ROTATIONAL POSITION SENSING MISS AVOIDANCE IN DIRECT ACCESS STORAGE DEVICES

CROSS-REFERENCE TO RELATED APPLICATION

The present application contains subject matters related to co-pending application Ser. No. 07/575,735, filed Aug. 31, 1990, and assigned to the assignee hereof and incorporated by reference herein now U.S. Pat. No. 5,155,814.

BACKGROUND OF THE INVENTION

1. Technical Field

The invention relates data storage systems for data processing systems and more particularly relates to controllers for disk drives and to a system and method for rotational position sensing miss avoidance in disk drive units where serving a plurality of host computer systems.

2. Description of the Related Art

Data processing systems frequently include large scale storage devices such as Direct Access Storage Devices ("DASD"), located externally to the host computer and sometimes at significant distances therefrom. Communication from the host computer to the DASD is accomplished over signal cables, called channels, extending between the host and the control unit.

DASD units frequently use a Count Key Data architecture (CKD) where records written on the track are provided with a count field (an ID) a key field and a data field. Count-key-data type direct access storage devices are a class of disk drive type data storage devices commonly employed with midrange and main frame computers. Historically, data transfer between count-key-data type disk drive units and host computer systems has been a synchronous operation. The connection of elements providing a communication channel between disk drive and host for the data transfer operations are timed to the rotation of the disk The need for synchronization stems from advantages obtained in utilizing elements of the communication channel between a host computer and a disk drive for more than one function.

Elements of a communication channel may be used for other functions during the quiet between data bursts between drive and host. For example, in main frame systems a disk drive controller is typically interposed between more than one computer and more than one disk drive. Any computer may access any disk drive. Elements of the controller connect a selected disk drive to a selected computer for a data exchange at the point when disk rotational position is appropriate for data exchange.

If the disk is inappropriately positioned for a requested exchange, the elements of the controller that would otherwise be used to establish the connection may be used for another purpose for example, the connection of another host to another disk drive. A "disconnection" between the host and the controller is performed to free elements of the paths for other use. Prior to the selected disk reaching the appropriate rotational position for a data exchange, the elements of a channel between drive an attempt to reconnect host to drive is made to provide a data pathway for the transfer operation. Reconnection requires time, particularly for the controller and the host to exchange control signals down a connecting cable to the host. Failure to establish a reconnection requires an additional rotation of the disk before reading of the data field can occur, or a so-called rotational position sensing (RPS) miss. Recovery from such misses are time consuming and accordingly, are undesirable.

In the count-key-data architecture, a count field and an optional key field always precede the data field. Except in a FORMAT write operation, the count field is in the read mode while the data field may be in either the read or write mode. In writing these fields along a recording track, a gap is provided between each of the fields. Those gaps are then utilized to provide a time period in which the direct access storage device control unit and the host channel can communicate with each other. It is during the gap time that the control unit provides information back to the channel in response to the command that it has received and gets the next command in order to begin the next operation for searching, retrieving or writing records. This process is termed gap synchronous, that is to say, that the particular record on which the direct access storage device is working, is the same record on which the channel has requested work, so that both the channel and the device are synchronous with each other in the sense that they are both working on the same record, either to read it or to write it.

As systems become faster and faster, the delays created by the gaps or by the performance of functions within a gap period have to be shrunk to such an extent that the functions can no longer be adequately performed. This is particularly true of optical fiber channels where the data burst rate is several times the burst rate for copper channels.

Synchronous operations provided good results so long as the propagation time for signals on connecting lines between a host computer system and the disk drive storage controller is not too long. Propagation time is a function of the length of the connecting cable and thus providing synchronous operation between host computer and disk drive imposed a practical upper limit on the physical distance between host and disk drive controller.

Achieving synchronization has been further complicated by the introduction of optical fiber cables connecting DASD controllers and host computers. The data burst rate over optical fiber cables is much higher than previous systems. Rate changing buffers are used to accommodate the burst rate differences between disk drives and the connection to the host computer, but such cables have still introduced even longer propagation delays. Accordingly, such cables are best handled in an nonsynchronous manner.

Establishing a reconnection requires availability of all the elements of the communication path. Some of those elements may have been claimed for another task after the disconnection For example, the required port on the host computer may be busy with another storage path, or the upper port of the controller may have become engaged with another host device. The diminishing duration of the reconnection gap reduces the time available to secure the elements of the channel.

370 extended (370 XA) architecture used in data processing systems available from International Business Machines Corporation provides some capability for overcoming traffic congestion on a desired path. The 370 XA architecture supports connection of a host to a DASD controller on from two to four separate physical linkages. A controller, through parallel storage clusters can be connected to up to sixteen cables. A request need not be responded to over the same channel on which it was received. In other words, upon indication that a disk is ready, the controller can secure any of up to four physical links back to a host to establish a data path.

Nonsynchronous storage subsystems have been developed to enable the channel and the device to transfer data independently of each other. To do that a buffer has been inserted into the data path between the device and the channel with separate data paths for the channel and the device, each under the control of a separate process. In that manner, the device process can access records in one portion of the buffer while another portion of the buffer is being used by the channel process. Channel programs can be executed such that the channel and storage control activities required to end execution of one command and advance to the next do not have to occur during the inter-record gap between two adjacent fields.

In a synchronous system, the device and channel operate on the same record so that the data transferred to the buffer by the device is the same data that the channel wants. In the control unit for such a system, shared variables are all that are required to implement the interface between the channel process and the device process. Simple shared variables are adequate because the channel process and device process are always performing the same operation on the same field. In a nonsynchronous system, however, the device may operate significantly ahead of the channel during read operations. The device process is transferring data into the buffer from the device while the channel process is accessing that data in order to send it on to the channel. The device process is therefore the filling or leading activity, while the channel process is the trailing or lagging activity. The reverse is true during write operations where the channel process fills the buffer with data from the channel and, subsequently, the device process accesses that data to send it to the device for writing the records on the storage disks. In this instance, the channel process is the leading, or filling activity while the device process is the trailing, or emptying activity. Since in a nonsynchronous control unit the channel and the device process can be performing different operations on different fields, a more elaborate communication system between the two is required.

SUMMARY OF THE INVENTION

The invention provides a system and method of providing rotational position sense miss avoidance for direct access storage devices for data transfer between a plurality of computer systems connected to a controller and a plurality of count-key-data field direct access data storage devices connected to the controller. The controller includes a plurality signal paths for completing channel paths between a computer system and a direct access storage device. The controller responds to a request from a computer system for a direct access storage device. Responsive to a device sector ready interrupt from the requested direct access storage device, it is determined if the operation pending on the direct access storage device is a miss avoidance candidate. Responsive to determination that an operation pending on the direct access storage device is a miss avoidance candidate, a miss avoidance lock to the direct access storage device is granted to a single signal path. Upon the device sector ready interrupt dropping and the request ageing beyond a predetermined threshold, it is determined if the request includes locate record and write commands. If yes, the request into the direct access data storage device is dropped, data from the direct access data storage device is staged into the cache, reconnection along any signal path is enabled and data transferred from the computer system is written into the cache and into nonvolatile storage. If no, data from the direct access storage device is staged into a controller cache and to a rate changing buffer and upon reaching a track index on the direct access data storage device, staging is discontinued, the miss avoidance lock to the direct access storage device is released and the request from the computer system is treated as a cache hit. If instead the channel reconnects, the pending operation is satisfied out of the rate charge buffer.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
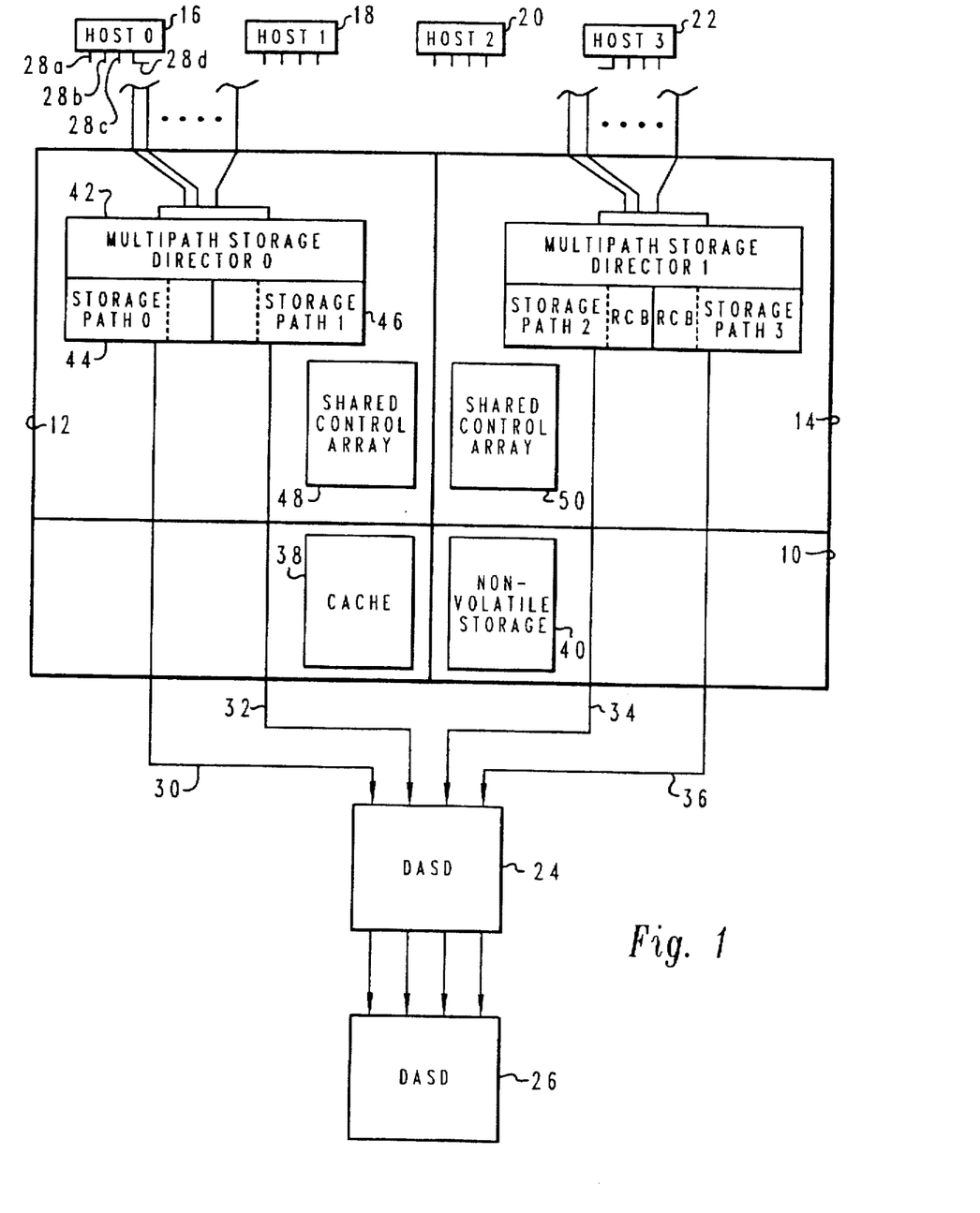
FIG. 1 is a high level block diagram of a storage controller for a plurality of direct data storage devices which may be utilized to implement the method and system of the present invention.

With reference now to the figures and in particular with reference to FIG. 1, there is depicted a high level block diagram of a storage controller 10. Storage controller 10 is preferably an IBM 3990 Model 3 type controller, which is available from IBM Corporation. Storage controller 10 has two storage clusters 12 and 14, each of which provides for selective connection between host computer systems 16, 18, 20 and 22 and direct access storage devices 24 and 26. Although four host computer systems and two direct access storage devices are depicted, storage controller can handle both additional computer systems and direct access storage devices.

Data for a given host computer system, for example host computer system 16, may be stored to any of direct access storage devices 24 and 26 or recovered from any of the direct access storage devices. Host computer system 16 is connected by at least two and by up to four cables 28(a)–(d) to storage controller 10. Where two cables are provided, one is connected to storage cluster 12 and the second to storage cluster 14. Where four cable connections are provided, two each are connected to storage clusters 12 and 14. The remaining host computers similarly have a plurality of connections to controller 10. In accordance with the 370-XA architecture, storage controller 10 may receive a request from host computer 16 over one cable, e.g. 28(b) and respond to it over any one of cables 28(a)–(d).

Notwithstanding connection to up to sixteen channels, storage controller 10 provides just four paths 30, 32, 34 and 36 out to direct access storage devices 24 and 26. Further, only one of paths 30, 32, 34 and 36 has access to a direct access storage device at a time. Because storage controller 10 attempts to synchronize disconnects and reconnects between direct access storage devices and host computers based upon rotational position of a disk in the direct access storage device, storage controller 10 may be seen to operate, in essence, as a data transfer traffic manager.

Storage controller 10 is internally divided into four sections, each having an independent power supply. Two sections correspond to storage clusters 12 and 14, respectively. A third section includes a cache 38. A fourth section includes a nonvolatile storage 40. Cache 38 provides for temporary storage of data recovered from a direct access storage device in response to a request from a host computer, or for temporary storage of data in transfer from a host computer to a direct access storage device, when synchronization of connection between storage device and host computer are not possible. Similarly, nonvolatile storage 40 is used for temporary storage of data being written to a storage device when synchronization of connections between storage device and the writing host are not possible. Storage of data in nonvolatile storage under such circumstances is required to allow indication to a host that the storage operation is logically complete, notwithstanding the fact that actual transfer of the data to a direct access storage device has not yet been completed.

Storage clusters 12 and 14 mirror one another in terms of functional features (although not in operations), and thus only storage cluster 12 is described here. Storage cluster 12 includes a multipath storage director 42 which operates as a four or eight by two switch between the cables (channels) from the host computer systems into storage cluster 12 and signal paths 44 and 46. Signal paths 44 and 46 are connected to the direct access storage devices along paths 30 and 32, respectively. Storage cluster 12 also includes a shared control array 48, which duplicates the contents of shared control array 50 in storage cluster 14. Shared control arrays 48 and 50 store path and group information as well as control blocks for the direct access storage devices.

Figure 2:
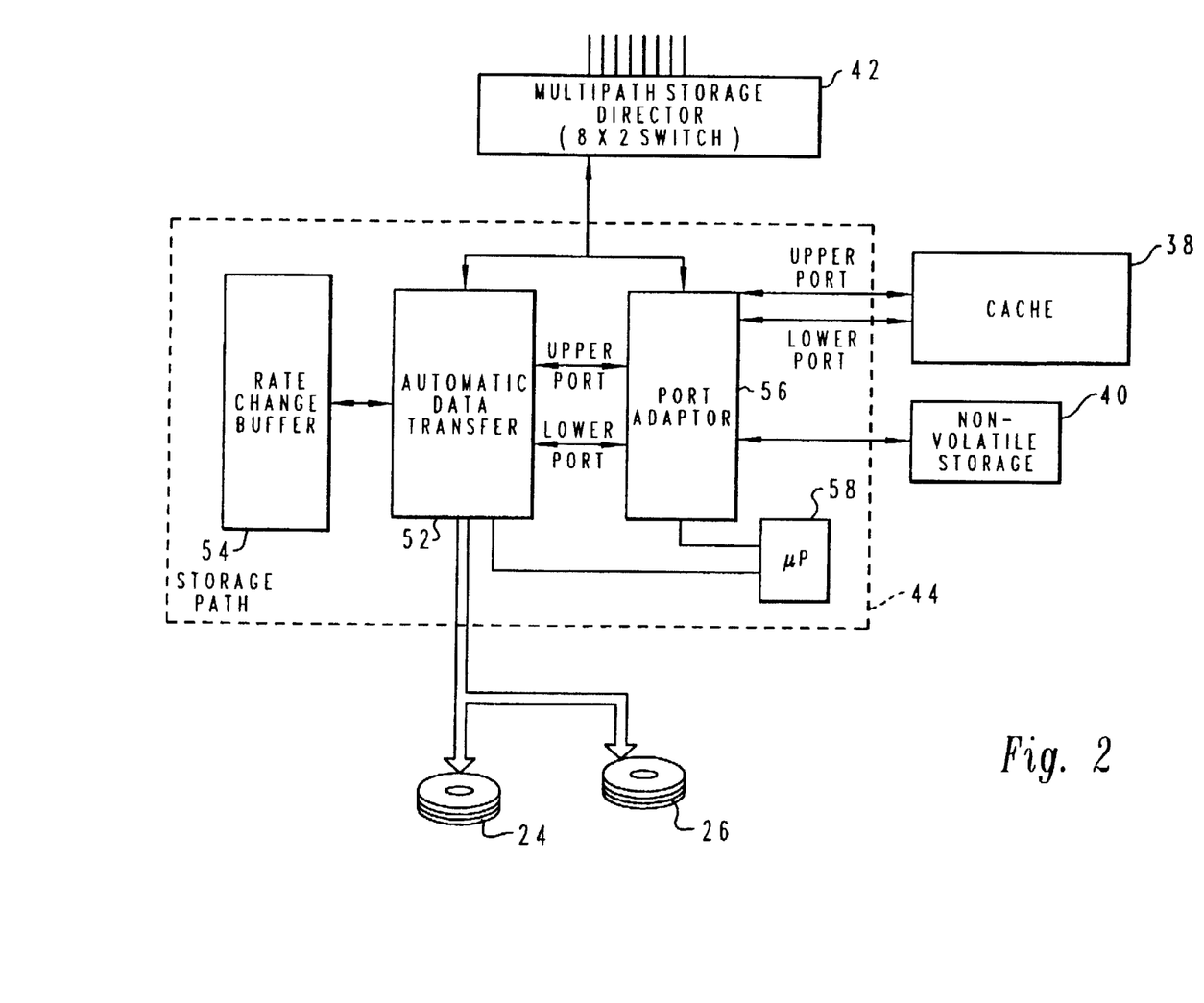
FIG. 2 is a high level block diagram schematic of a signal path processor within a storage controller for a plurality of direct access storage devices.

FIG. 2 illustrates signal processor 44 in a block diagram schematic. Signal processor 44 is connected out to multipath storage director by an upper port and to a plurality of direct access storage devices by a lower port. Data transfer between the multipath storage director 42 and one of direct access storage devices 24 or 26 during synchronous operations occurs via an automatic data transfer circuit 52 supported by a rate change buffer 54, if required. While two direct access storage devices are shown, as many as sixty-four such devices may be attached to a controller. Rate change buffer 54 compensates for differences between the speed of data transference by disk drive type direct access storage devices 24 and 26 and the operating speed of the physical links to host computers, which are typically faster.

A port adaptor 56 is used to control transfer of data into and out of cache 38 and nonvolatile storage 40. As discussed above, the presence of cache 38 and nonvolatile storage 40 provide for logical completion of certain data transfers, from the perspective of the host, without waiting for physical synchronization. All operations of signal path 44 are under control of a microcomputer 58.

Before data transfer can begin, the device control must be oriented. It does that by detecting either the index point or the start-of-count area other than record zero. Once the count area, or index, has been detected, the device control can work its way down the track to perform the operations commanded by the channel.

After validating the locate record parameters, the control unit directs the device to sees to a first-specified track, positions the device to the designated sector, and begins a search operation to further position itself to a particular record area on the track.

Figure 3:
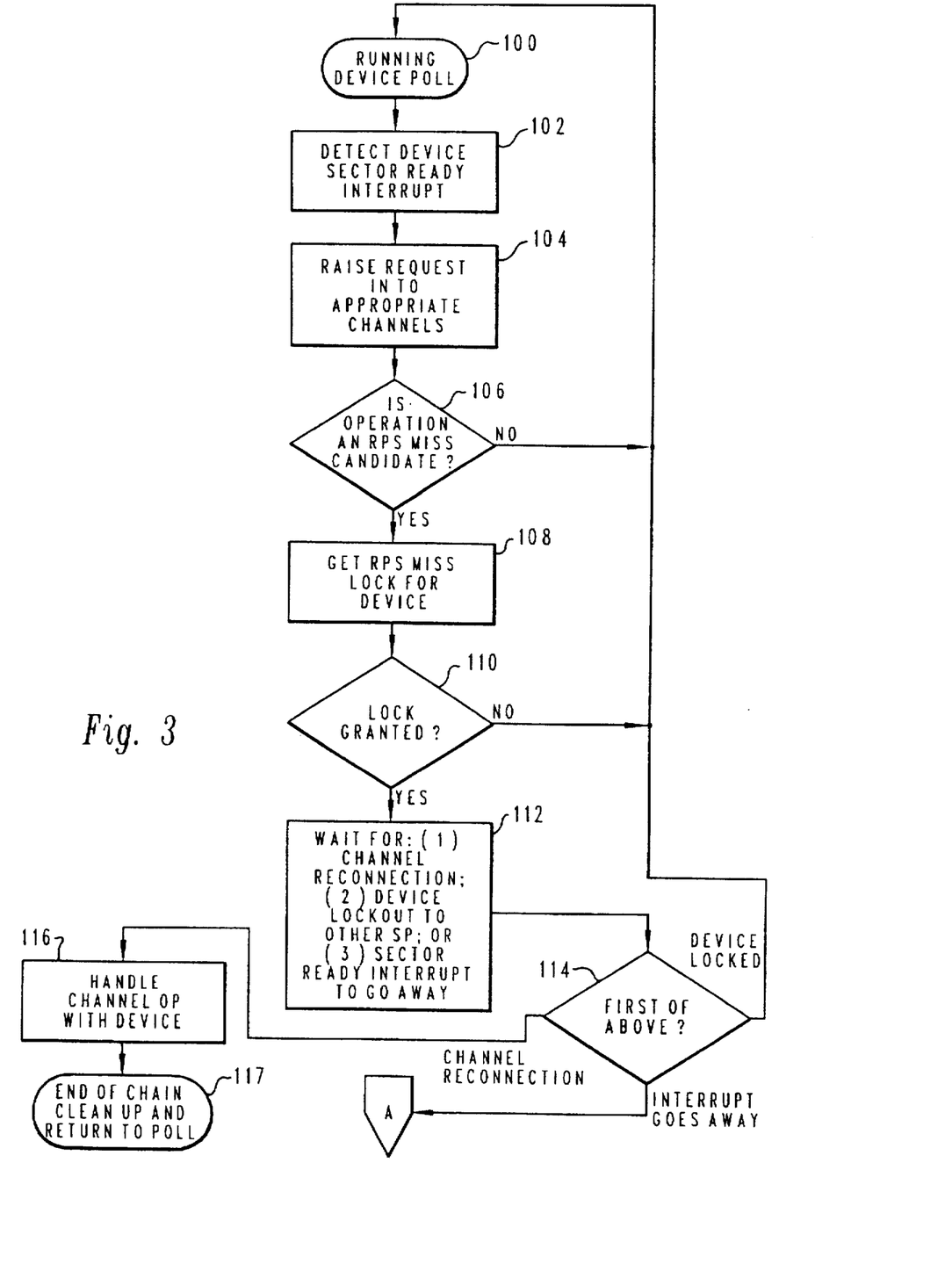
FIG. 3 is a logical flow chart for a software implementation of the system and method of the present invention on a data processing system incorporating a plurality of the signal path processors of FIG. 2.

FIG. 3 illustrates a logical flow chart for a process for implementing the system and method of the invention, executable on microcomputer 58. The RPS Miss Avoidance process first determines which devices subject to a request are candidates for miss avoidance. Terminal block 100 represents periodic polling occurring during operation of microcomputer 58, done to begin determination if an operation pending on any device has become a candidate for RPS miss avoidance. Block 100 is illustrated as a terminal block to indicate that it is the entry point into the RPS Miss Avoidance process. Process block 102 indicates that a device sector ready interrupt was detected for a direct access storage device during such polling. Information relating to a particular physical device is maintained in a control block for the device, as is known in the art.

At process block 104, a raise request into the appropriate channels is done after recovery of path group information from the shared control array. Next, decision block 106 is executed to determine if a direct access storage device for which the sector ready interrupt was raised has an operation pending which is an RPS miss candidate. An operation qualifies as an RPS miss candidate whenever its channel program runs nonsynchronously. These situations occur when (1) the commands were received ever a nonsynchronous channel path (e.g. an optical fiber cable from storage controller 10 to a host computer system), or (2) a command is defined as being nonsynchronous (e g. a locate record command). Appropriate control bits will have been set prior to polling during channel disconnection. During channel disconnection, a channel manager routine passes an RMA indicator to a device manager. Responsive to the value of the RMA indicator, the device manager sets the RMA expected device interrupt bit map for the device. This bit map is used to determine candidacy of an operation pending on a device. If the operation is not an RPS miss candidate the miss avoidance algorithm is exited and the process returns to polling (block 100).

If an operation has qualified as an RPS candidate, the microcomputer for the signal path executes block 108 and attempts to procure an RPS miss lock to the device for which the operation is pending. Up to four signal paths, each under the control of a microcomputer, may be attempting to secure the miss lock. However, a maximum of one such lock per device is granted. Thus, a maximum of one signal path provides RPS miss avoidance for a device 24 or 26. Remaining signal paths, denied the lock, return by the NO path from decision block 100 to polling for device sector ready interrupts (step 100).

The YES path from decision block 100 indicates a lock grant. Next, process block 112 and decision block 114 represent waiting for one of three possible occurrences, one of which requires continuation of the RPS miss avoidance process. First, a channel reconnection may be effected by the current signal path, avoiding need to continue the process. Process execution continues with decision block 114, detecting the channel reconnection, and block 116, indicating that the channel operation is handled directly with the direct access storage device. Terminal block 117 is next executed to effect end of command chain clean up and return to poll (block 100). Second, a channel reconnect may be effected by another signal path resulting in a device being locked and avoiding need to continue the RPS miss avoidance program. Processing returns to polling (block 100) Lastly, where the sector ready interrupt drops and the request ages beyond a threshold, the need to proceed with the a RPS miss avoidance reconnection is indicated. The first and second outcomes represent a channel retaking control of the data transfer and discontinuance of the RPS miss avoidance reconnection. The last option continues the RPS miss avoidance reconnection.

Figure 4:
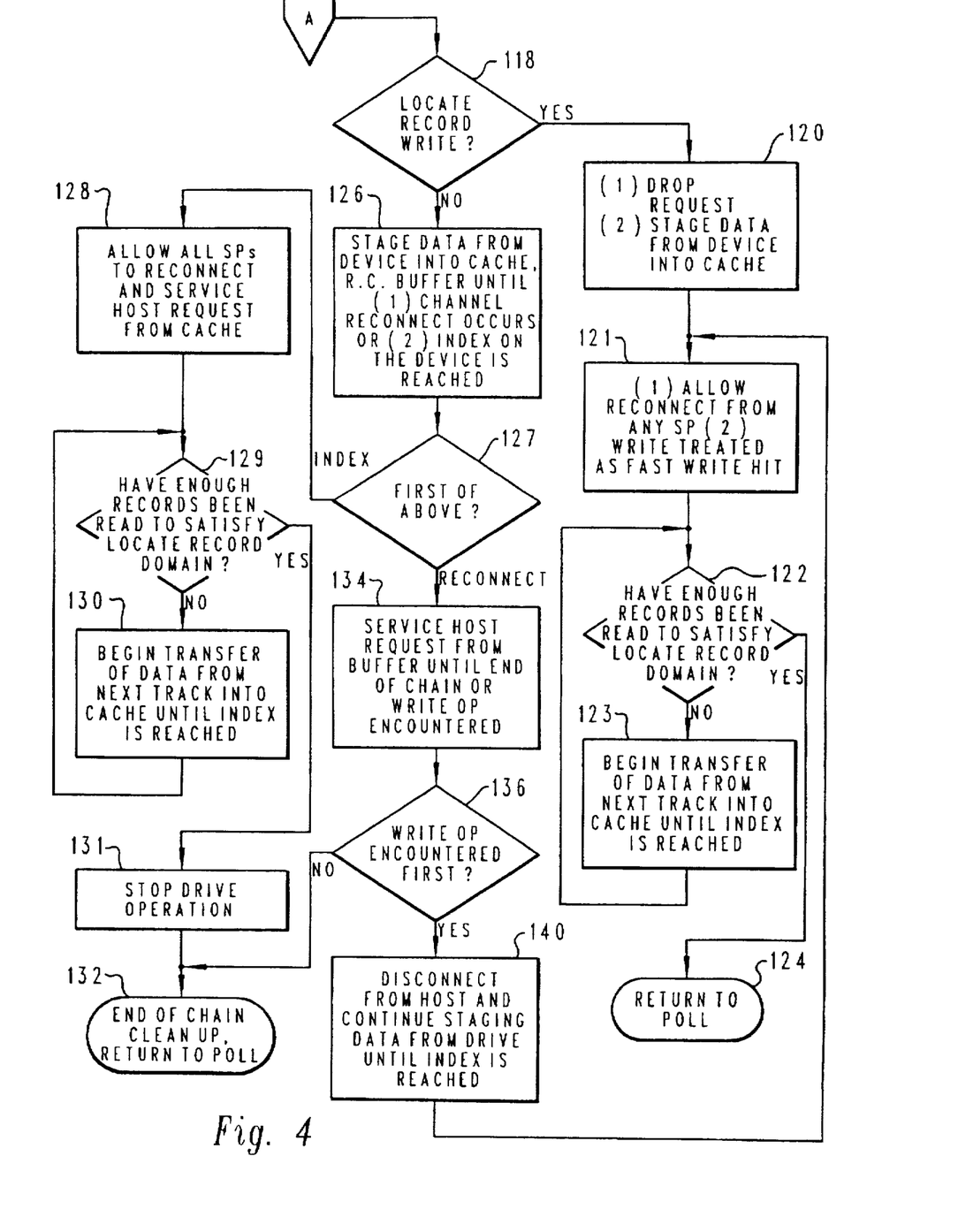
FIG. 4 is a continuation of the logical flow chart of FIG. 3.

Execution of decision block 118 represents continuation with an RPS miss avoidance reconnect. Determination of the nature of the request being handled is required to determine proper routing of data into the various data storage areas and buffers provided in controller 10. At decision block 118 it is determined if the command being responded to is a "Locate Record-Write". If it is, the YES branch from block 118 advances execution to block 120. Block 120 is executed to: (1) drop the request for channel(s) on behalf of that device; and (2) stage data from the locate record stage from the device into the cache 38. Next, block 121 is executed to reset control blocks to allow reconnection to any signal path and to treat the Write as a fast write hit, meaning that an image of the track being rewritten is stored to cache 38 and nonvolatile storage 40. Logically, the write appears to the host as complete, and can be treated as such because a complete image of the trace is extant in nonvolatile storage awaiting transfer to disk drive storage. The process can end after block 121 with a return to poll processing, or, if extended control key data field (ECKD) architecture is used, may continue. ECKD architecture permits channel programs to describe the nature and scope of a data transfer before the first data transfer command is executed. ECKD includes a Locate Record extended command which utilizes variable length parameter list to define the operational domain for the subsequent Channel Command Word chain. The parameter specify the operation to be performed, the location and number of records to or tracks to be processed, and a transfer length factor. With execution of decision block 122, the process determines if enough records have been read to satisfy the Locate Record domain. If not, data transfer from the next track into cache is began and continues until the track index is reached. Once enough records have been read the process is exited with a return to poll processing (block 100).

Returning to decision block 118, the NO branch indicates failure to identify the command as a "Locate Record-Write". Block 126 is executed to a stage data from the direct access storage device into cache 38 and into rate change buffer 54 until one of two events occur, those being: (1) a channel reconnection occurs; or (2) the track index on the device is reached. Where a track index is first encountered, the "INDEX" branch from decision block 127 is followed leading to execution of operations represented by block 128, which are: (1) changing of parameters in the device related control blocks to allow any signal process unit to reconnect; and (2) servicing the host computer system from cache when connection is achieved, i.e. treating the host request as a cache hit. Where ECKD architecture is utilized, block 129 is executed to determine if enough records have been read to satisfy the Locate Record domain. Until all such records are read, the process loops through process block 130, reflecting, with each new track, initiation of transfer of data from the track into cache until the track index is reached. Once the records have been read to satisfy the Locate Record domain, block 131 is next processed to discontinue the operation relating to the direct access storage device. With block 132, end of chain clean up is performed and processing is returned to poll operations.

When a channel reconnection is established (the "RECONNECT" branch from block 127), block 134 is executed to direct servicing of the host computer request from rate change buffer 54 until the end of the command chain, or until a WRITE operation is encountered, whichever comes first (block 136). Block 134 represents nonsynchronous operation taught in U.S. application Ser. No. 07/575,735. Where the command chain has been completed (the NO branch), processing of the RPS miss avoidance reconnect is also completed except for routine cleanup operations (block 132) and a return to polling (block 100) is done.

Occurrence of a WRITE operation in a command chain (the YES branch from block 136) advances the process to block 140. With execution of block 140 a channel disconnect from the host computer system which was the source of the requests is effected and data from the direct access storage device is staged to cache 38 until the track index is reached. The WRITE operation is then handled as a fast write hit by execution of block 122, described above.

While the invention has been particularly shown and described with reference to a preferred embodiment, it will be understood by those skilled in the art that various changes in form and detail may be made therein without departing from the spirit and scope of the invention.

What is claimed is:

1. A method of providing rotational position sensing miss avoidance for data transfer operations between a plurality of computer systems connected to a controller and a plurality of direct access data storage devices which utilize count-key-data field format connected to the controller, wherein the controller includes a plurality of signal paths for completing channel paths between a computer system and a direct access storage device, the method comprising the steps of:

generating a request from a computer system for a data transfer operation for a direct access storage device;

responsive to a device sector ready interrupt from the direct access storage device, determining if a data transfer operation pending on the direct access storage device is a miss avoidance candidate;

responsive to determination that said data transfer operation pending is a miss avoidance candidate, granting a miss avoidance lock to the direct access storage device for a signal path;

upon the device sector ready interrupt dropping and the request from the computer system ageing beyond a predetermined threshold, staging data from the direct access storage device into a controller cache; and upon reaching a track index on the direct access data storage device, discontinuing staging of data from the direct access storage device, releasing the miss avoidance lock to the direct access storage device, and treating the request from the computer system as a cache hit.

2. A method of providing rotational position sensing miss avoidance as set forth in claim 1, wherein the step of staging data further includes staging data to a controller rate change buffer.

3. A method of providing rotational position sensing miss avoidance as set forth in claim 2, the method further comprising the step of:

responsive to a reconnect between the computer system and the direct access storage device occurring after beginning the step of staging data but prior to encountering the track index, servicing the request from the computer system from the controller rate change buffer.

4. A method of providing rotational position sensing miss avoidance as set forth in claim 3, the method further comprising the steps of:

responsive to encountering a write operation in a channel command word during servicing of the request from the computer system from the controller rate change buffer, disconnecting the controller from the computer system;

continuing staging of data from the direct access storage device until the track index is reached;

allowing reconnection of the computer system and the direct access storage device along any signal path; and writing data from the computer system to the controller cache and to nonvolatile storage.

5. A method of providing rotational position sensing miss avoidance as set forth in claim 1, the method further comprising the step of:

upon the device sector ready interrupt dropping and the request from the computer system ageing beyond said predetermined threshold and prior to staging data from the direct access storage device into said controller cache, determining if the request from the computer system includes locate record and write commands; and upon determination that the request from the computer system includes the locate record and write command, dropping the request into the direct access data storage device, staging data from the direct access data storage device into the controller cache, allowing reconnection of the computer system and the direct access storage device from any signal path, and writing data from the computer system into the controller cache and into nonvolatile storage to produce an image of a track.

6. A controller for direct access data storage devices of the count-key-data field type providing synchronous and nonsynchronous data transfer operations between a plurality of computer systems connected to the controller and a plurality of direct access data storage devices connected to the controller via a plurality of signal paths, the controller comprising:

a controller cache;

means for receiving a request from a computer system for a data transfer operation for a direct access storage device;

means responsive to a device sector ready interrupt from the direct access storage device for determining if a data transfer operation pending for the direct access storage device is a miss avoidance candidate;

means responsive to determination that said data transfer operation pending is a miss avoidance candidate for granting a miss avoidance lock to the direct access storage device for a signal path;

means responsive to the device sector ready interrupt dropping and the request from the computer system ageing beyond a predetermined threshold for staging data from the direct access storage device into said controller cache; and means responsive to a track index on the direct access data storage device being reached for discontinuing staging of data from the direct access storage device, for releasing the miss avoidance lock to the direct access storage device, and for treating the request from the computer system as a cache hit.

7. A controller as set forth in claim 6, and further comprising:

a controller rate change buffer, wherein the means for staging data also stages data to the controller rate change buffer.

8. A controller as set forth in claim 7, further comprising:

means responsive to a reconnect between said computer system and the direct access storage device occurring during the staging of data but prior to said track index being reached for responding to the request from the computer system from the controller rate change buffer.

9. A controller as set forth in claim 8, further comprising:

means responsive to detection of a write operation in a channel command word during a response to the request from the computer system from the controller rate change buffer for disconnecting the controller from the computer system;

means for reconnecting the computer system and direct access storage device along any signal path; and means for writing data from the computer system to the controller cache and to nonvolatile storage.

10. A controller as set forth in claim 6, further comprising:

means responsive to the device sector ready interrupt dropping and the request from the computer system ageing beyond a predetermined threshold prior to staging data from the direct access storage device into said controller cache for determining if the request from the computer system includes locate record and write commands; and means responsive to a determination that the request from the computer system includes the locate record and write command for dropping a request into the direct access data storage device, for staging data from the direct access data storage device into the controller cache, and for writing data from the computer system into the controller cache and into nonvolatile storage to produce an image of a track.

11. A data processing system comprising:

a plurality of direct access data storage systems supporting count-key-data field storage;

a plurality of computer systems for generating data transfer operation requests of the plurality of direct access data storage systems via a plurality of signal paths; and controller means for providing synchronous and nonsynchronous data transfer between the plurality of computer systems and the plurality of direct access data storage systems;

the controller means including, a controller cache, means for receiving a data transfer operation request from a computer system for a direct access storage device, means responsive to a device sector ready interrupt from the direct access storage device for determining if a data transfer operation pending for the direct access storage device is a miss avoidance candidate, means responsive to a determination that said data transfer operation pending is a miss avoidance candidate for granting a miss avoidance lock to the direct access storage device for a signal path, means responsive to the device sector ready interrupt dropping and said data transfer operation request from the computer system ageing beyond a predetermined threshold for staging data from the direct access storage device into said controller cache, and means responsive to a track index on the direct access data storage device being reached for discontinuing staging of data from the direct access storage device, for releasing the miss avoidance lock to the direct access storage device, and for treating the request from the computer system as a cache hit.

12. A data processing system as set forth in claim 1, wherein the controller means further includes a controller rate change buffer and the means for staging data further includes means for staging data to the controller rate change buffer.

13. A data processing system as set forth in claim 12, wherein the controller means further comprises:

means responsive to a reconnect between a computer system and a direct access storage device occurring during the staging of data but prior to said track index being reached for responding to the request from the computer system from the controller rate change buffer.

14. A data processing system as set forth in claim 13, wherein the controller means further comprises:

means responsive to encountering a write operation in a channel command word during response to the request from the computer system from the controller rate change buffer for disconnecting the controller rate change buffer from the computer system;

means for reconnecting the computer system and said direct access storage device along any signal path; and means for writing data from the computer system to the controller cache and to nonvolatile storage.

15. A data processing system as set forth in claim 11, wherein the controller means further comprises:

means responsive to the device sector ready interrupt dropping and the request from the computer system ageing beyond a predetermined threshold prior to staging data from the direct access storage device into said controller cache for determining if the request from the computer system includes locate record and write commands; and means responsive to a determination that the request from the computer system includes the locate record and write command for dropping said request into the direct access data storage device, for staging data from the direct access data storage device into the controller cache, for reconnecting the direct access data storage device and the computer system along any signal path, and for writing data from the computer system into the controller cache and into nonvolatile storage to produce an image of a track.

* * * * *

UNITED STATES PATENT AND TRADEMARK OFFICE
CERTIFICATE OF CORRECTION

PATENT NO. : 5,893,918
DATED : Apr. 13, 1999
INVENTOR(S) : *Beardsley et al.*

It is certified that error appears in the above-identified patent and that said Letters Patent is hereby corrected as shown below:

In col. 4, line 3, please change "charge" to -- change --.

In col. 5, line 60, please change "sees" to -- seek --.

In col. 10, line 59 (CLAIM 12), please change "claim 1" to -- claim 11 --.

Signed and Sealed this

Seventh Day of December, 1999

Attest:

Q. TODD DICKINSON

Attesting Officer

Acting Commissioner of Patents and Trademarks